United States Patent
Ranganathan

(10) Patent No.: US 7,085,576 B2
(45) Date of Patent: Aug. 1, 2006

(54) METHOD AND APPARATUS FOR PROVIDING STREAMING INFORMATION TO A WIRELESS MOBILE WIRELESS DEVICE

(75) Inventor: Sowmyan Ranganathan, Lombard, IL (US)

(73) Assignee: Motorola, Inc., Schaumburg, IL (US)

( * ) Notice: Subject to any disclaimer, the term of this patent is extended or adjusted under 35 U.S.C. 154(b) by 81 days.

(21) Appl. No.: 10/334,095

(22) Filed: Dec. 30, 2002

(65) Prior Publication Data

US 2004/0192342 A1 Sep. 30, 2004

(51) Int. Cl.
*H04Q 7/20* (2006.01)

(52) U.S. Cl. .............................. 455/456.1; 455/422.1; 455/404.2; 455/445; 370/328; 709/231

(58) Field of Classification Search .. 455/456.1–456.6, 455/428, 432.1, 436, 445, 404.2, 4, 3.06, 455/422.1; 370/328, 349; 709/226, 229, 709/231; 700/300, 1; 701/201
See application file for complete search history.

(56) References Cited

U.S. PATENT DOCUMENTS

| | | | | |
|---|---|---|---|---|
| 4,402,090 A | * | 8/1983 | Gfeller et al. | 398/119 |
| 6,016,520 A | | 1/2000 | Facq et al. | |
| 6,097,958 A | * | 8/2000 | Bergen | 455/456.2 |
| 6,202,023 B1 | * | 3/2001 | Hancock et al. | 701/201 |
| 6,405,127 B1 | * | 6/2002 | Doner | 701/207 |
| 6,487,393 B1 | * | 11/2002 | Davenport et al. | 455/445 |
| 6,522,875 B1 | * | 2/2003 | Dowling et al. | 455/414.3 |
| 6,757,735 B1 | * | 6/2004 | Apostolopulos et al. | 709/231 |
| 2001/0041576 A1 | * | 11/2001 | I'Anson et al. | 455/456 |
| 2002/0052674 A1 | | 5/2002 | Chang et al. | |
| 2002/0142773 A1 | * | 10/2002 | Rudrapatna et al. | 455/456 |
| 2002/0160745 A1 | * | 10/2002 | Wang | 455/404 |
| 2003/0065712 A1 | * | 4/2003 | Cheung et al. | 709/203 |
| 2003/0078055 A1 | * | 4/2003 | Smith et al. | 455/456 |
| 2003/0203730 A1 | * | 10/2003 | Wan et al. | 455/456.1 |
| 2004/0203615 A1 | * | 10/2004 | Qu et al. | 455/412.1 |

FOREIGN PATENT DOCUMENTS

| | | |
|---|---|---|
| EP | 0302431 A2 | 8/1989 |
| EP | 0302431 B1 | 4/1992 |
| EP | 1039721 A2 | 9/2000 |

* cited by examiner

*Primary Examiner*—Temica Beamer
*Assistant Examiner*—Kamran Afshar
(74) *Attorney, Agent, or Firm*—Vedder, Price, Kaufman & Kammholz, P.C.

(57) ABSTRACT

A method and apparatus, for acquiring at least mobile wireless device direction information (132), based upon at least two different mobile wireless device time-location entries (123) of a mobile wireless device (102). This mobile wireless device direction information (132) is then used to send different segments of streaming information (121A–C) to a plurality of multi-mobile streaming information network memories (120A–C), for communication to the mobile wireless device (102). Each streaming information network memory (120A–D) is associated with a different base station (118A–D).

10 Claims, 10 Drawing Sheets

METHOD AND APPARATUS FOR PROVIDING STREAMING INFORMATION TO A WIRELESS MOBILE WIRELESS DEVICE

FIELD OF THE INVENTION

The invention relates generally to sending information to mobile wireless devices, and more particularly to methods and apparatus for providing streaming information to in-transit mobile wireless devices.

BACKGROUND OF THE INVENTION

Wireless information communication systems currently exist which connect mobile wireless devices, e.g., cell phones, personal data assistants (PDAs), laptop computers, Internet appliances or other suitable devices, also known as mobile wireless communications devices, through a network of base stations, e.g., wireless wide area network (WWAN) base stations and WLAN transmitters, also known as wireless communications networks. For example, such systems are known to utilize both (or either) WWANs and WLANs. WWAN systems are known to include, for example, the following systems: General Packet Radio Service (GPRS), Code-Division Multiple Access (CDMA), Wideband CDMA (W-CDMA) and Universal Mobile Telecommunications System (UMTS). WLAN systems, on the other hand, typically include short range wireless local-area networks (WLANs) such as Bluetooth or IEEE 802.11 systems.

Wireless information communication systems are known to handle information, including, voice, video, pictures, text, and other types of data. Such systems are also known to handle very large files of information, particularly those characterized by their continuous streams of video or audio, also known as streaming information. A typical example of streaming information is a file containing video, such as a movie clip that is linked to a web page or live audio or video. Streaming information is typically handled in such a way as to allow for a recipient to begin displaying the information before the entire file is transmitted. For the intended effect, streaming information must be available in a steady stream so that it can be reproduced in a continuous manner. If the information does not arrive quickly enough the presentation will not be smooth. Since such information is said to be streamed to a receiving device, the sending of such information is often described as "streaming information."

A known bottleneck currently exists in the transmission of streaming information to wireless mobile devices. This bottleneck occurs where such wireless mobile devices, while receiving streaming information, cross base station service area boundaries, also known as cellular area boundaries, where the mobile wireless device travels from one base station service area, or cell, into an adjacent base station service area, or cell, causing the mobile wireless device to be connected with a new base station. When a mobile wireless device is connected to a particular base station, i.e., is receiving streaming information therefrom, such base stations, or network infrastructure, are said to be supporting communication of the mobile wireless device. More specifically, wireless mobile devices, while in one cell site (e.g., connected to particular base station), scan other available cell sites (supported by base station controllers and mobile switching centers) to locate the best signal and shift among such cell sites. The switches are typically connected through an asynchronous transfer mode (ATM) link and when a new cell site is identified the ATM backbone pipes the streaming information to the identified switch. Here, delays are introduced because the new base station is initially unaware of the mobile wireless device's association with the streaming information. Once the new base station is aware of a need of the particular streaming information, it must then make a network request to acquire the information. It is not until the requested information reaches the new base station that the information can be passed on to the mobile wireless device. As a result, the process of a wireless mobile wireless device being handed off to a new base station results in a delay in the sending of streaming information to such devices.

At least one design attempts to reduce the latencies involved with a mobile wireless device crossing between wireless base stations coverage areas by detecting such a crossing prior to its occurrence, and copying the information intended for transmission from the current base station to the next base station. In the case of handling streaming information, this design would also, as part of the copying of information to the next base station, copy the current packet information such that the new base station could continue to transfer the streaming information in a continuous fashion. In such systems a mobile wireless device monitors the electrical signal intensity of wireless cells and predicts that it is moving toward a particular wireless cell. The mobile wireless device then notifies a management device that the mobile wireless device will soon be traveling into a particular new base station service area, or cellular area, and to copy the entire current base station related cache information into the predicted new base station related cache. Cache is a high speed storage mechanism. Cache is effective because most programs access the same data or instructions over and over. Here, cache is being used to solve a problem of accessing time-dependent streaming information. This use of cache helps network load balancing and optimum routing. Further, if streaming information is stored in such a cache, and if a portion of such streaming information had since been transmitted to the mobile wireless device, then, the copying of the entire cache to the new base station would include copying of a sending overlapping portion (that already sent to the mobile wireless device) of such current streaming information into the new base station's related cache. In addition to the mobile wireless device identifying a next base station, this design also allows for a management device connected to the network to make the next base station identification by logging the base station service areas to which the mobile wireless device has been attached, and then identifying the immediate next base station or base station service area based on the knowledge of the location of the previous base stations or base station service areas. In either case the entire cache of a previous base station is copied to the next base station.

It should be noted that the above described design was not directed to WLANs. It is known that WLANs generally operate in a fashion significantly different than WWANs. For example, WLANs utilize small buffers, rather than cache, to store information associated with their base stations. Such buffers differ from cache in that they are a few kilobytes to a few megabytes, where cache is generally of the order of gigabytes. In addition, WLANs are not known to utilize predictive base station functionality, WLANs usually detect the entry of a wireless mobile wireless device into a another base station service area and transfer control to the new base station. In determining the next base station, or access point, WLANs typically use signal strength and signal to noise ratios. The current WLAN base station, or access point, is then able to initiate a handoff to this next base station. The wireless mobile device then scans for base stations, or access points, using what is typically known as a MAC layer function. The wireless mobile device listens to an base station, or access point, during the scan and creates a prioritized list of access points to choose from.

There are also systems that predict the future location of an in-transit mobile computer based upon the mobile computer's current location, velocity and direction. Such systems use this information for the purpose of retrieving geography based information associated with the predicted location. More specifically, the geography based information is used to retrieve local street maps or to retrieve other information based upon the physical surroundings of where the wireless mobile computer is expected to be at a future particular time. The location of the mobile computer is determined or acquired by using GPS receivers, cellular network triangulation positioning systems, and the cell IDs of the associated cellular wireless phone systems. Further, moving condition controllers and moving condition memory are used in predicting the future position of the mobile computers. Such systems do not address the sending of segments of streaming information to predicted network base stations.

In recent years the use of streaming information has continued to grow. With this growth, and the corresponding increase in the quantity and size of the requests for this information, there continues to be ever heavier burdens placed upon information communication systems As a result, there continues to be strong market forces in favor of the development of new ways to quickly deliver and process streaming information.

BRIEF DESCRIPTION OF THE DRAWINGS

The invention will be more readily understood with reference to the following drawings wherein like reference numerals represent like elements and wherein.

DETAILED DESCRIPTION OF THE PREFERRED EMBODIMENT

Figure 1:
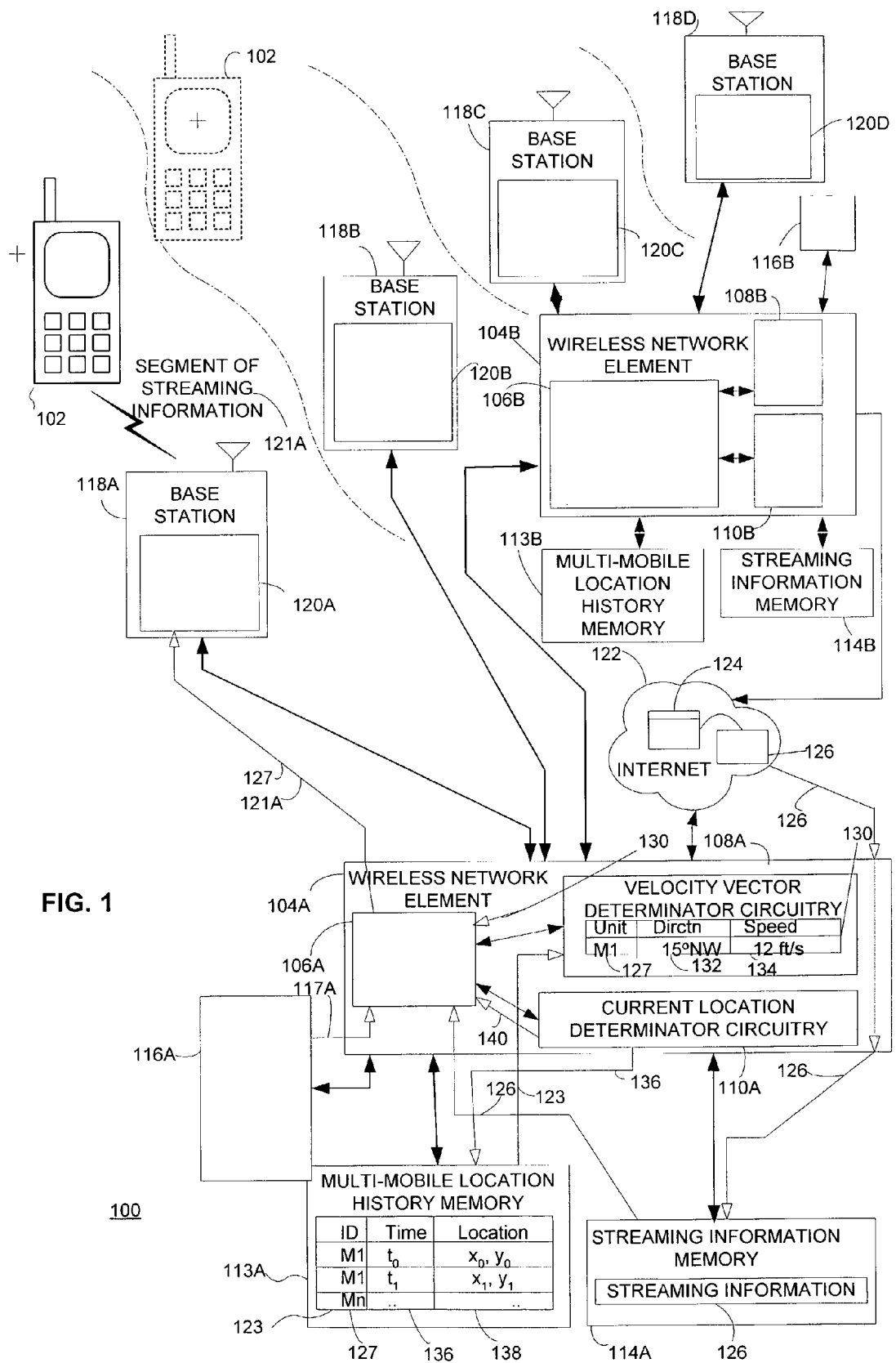
FIG. 1 is a block diagram illustrating one example of a system in accordance with one embodiment of the invention that provides streaming information through a wireless information communication system between a network base station and a mobile wireless device in accordance with one embodiment to the invention.

Briefly, a method and apparatus, acquires (or determines) at least mobile wireless device direction information, based upon at least two different mobile wireless device time-location entries of a mobile wireless device. This mobile wireless device information is then used to send different segments of streaming information to a plurality of multi-mobile streaming information network memories for communication to the mobile wireless device. Each multi-mobile streaming information network memory is associated with a different base station. Base stations include for example, radio frequency transceivers (RF transceivers), infrared transmitters or any suitable device for providing wireless communication to mobile wireless devices. Streaming information includes, but is not limited to video, audio or live broadcasts, for communication to the mobile wireless device. A segment of streaming information is that portion of a streaming information request that is expected to be sent to, and be received by, a mobile wireless device as the mobile wireless device is within a particular base station service area, e.g., cellular area. Multiple segments are sent to the wireless mobile device as the wireless mobile device passes through multiple base station service areas until the entire information request has been delivered in its entirety. As such, these segments of streaming information are then sent to the determined or predicted base stations during a mobile call or session. Because these segments of streaming information together make up a larger streaming information request, and each segment of streaming information is intended to be received by a different base station, each of the segments of information are different (e.g., not identical, and as discussed below, may contain overlapping information). Because of this structure such segments of streaming information are considered as present segments of streaming information and future segments of streaming information, or streaming present information or streaming future information. As such, the information in a streaming present information is different than that in streaming future information since they each contain information directed to different base stations for transmission to the wireless mobile device at different locations along its path. Further, such segments of streaming information are typically made up of a plurality of packets.

A predicted base station, that is predicted based on mobile wireless device direction information alone, can be said to be a base station determined to be along the path of the mobile wireless device, and as such, can also be described as being a base station that is more likely to support future communications of the mobile wireless device than base stations not along the path. Further, a predicted base station that is additionally predicted in further consideration of a mobile wireless device velocity information component, can be said to be described as a base station that is more likely to support future communications of the mobile wireless device than those base stations predicted on mobile wireless device direction information alone and later to be excluded by the additional calculation including the velocity component. Further, any occasion where a path is predicted, or where a path and time are predicted, and because of the unpredictability of the exact path of the mobile wireless device is not achievable, those base stations surrounding the predicted path, e.g., adjacent cells, are also more likely to support future communications of the mobile wireless device than base stations located elsewhere. Generally any particular base station service area or cell has a plurality of adjacent base station service areas or cells. It can also be said that where there exists base stations that are considered more likely to support communications of the mobile wireless device, there also therefore exists base stations that are considered less likely to support communications. It is also the case that the likeliness and less-likeliness each have levels thereof and some likely base stations are less likely than other likely base stations, and the same goes for the less-likely base stations.

In the preferred embodiment, mobile wireless device velocity information is also used in conjunction with the mobile wireless device direction information for what is described as velocity vector information. It is the use of the velocity vector information that allows for the determination of exactly what, and how long, any particular segment of streaming information should contain. The mobile wireless device velocity information allows for the determination of what portion of the streaming information to send in segments to what multi-mobile streaming information network memories.

In the preferred embodiment, the multiple segments of streaming information are sent to the predicted plurality of multi-mobile streaming information network cache memories. Although the preferred embodiment uses cache-type memories for the multi-mobile streaming information network cache memories, other embodiments use other types of memory to perform the same or similar functions. Also in the preferred embodiment, each base station is associated with a different multi-mobile streaming information network cache memory. The multi-mobile streaming information network cache memories are also considered to be their own memory device. Numerous mobile wireless devices are generally associated with any one particular multi-mobile streaming information network cache memory or base station at any one time, and since these connected multi-mobile streaming information network cache memories are capable of each receiving multiple segments of streaming information, any such multi-mobile streaming information network cache memory will often contain segments of streaming information from multiple mobile wireless devices. Although in different embodiments, the multi-mobile streaming information network cache memory, or memory devices, associated with particular base stations are locatable anywhere throughout the network, or in some embodiments are connected to the network in a variety of remote fashions as known by those skilled in the art, in the preferred embodiment, the multi-mobile streaming information network cache memories are located at each associated base station. Like cache memory generally, the information stored in the multi-mobile streaming information network cache memories need to be managed such that each multi-mobile streaming information network cache memory contains the highest priority information. This requires that old low priority information be discarded in favor of new high priority information. As such, some embodiments allow segments of streaming information stored in multi-mobile streaming information network cache memories to expire after a set time has elapsed. Other embodiments use the same technique in combination with a delayed delivery approach such that the segment of streaming information does not arrive until it is expected to be needed. Yet other embodiments deliver the segments of streaming information with an estimated time of arrival of the mobile wireless device, such that the system can purge this information once this time has passed without the arrival of the mobile wireless device. In addition, other embodiments recognize when a current set of predicted multi-mobile streaming information network cache memories and segments of streaming information are no longer accurate, for example, after a change in direction of the mobile wireless device is detected. Such embodiments, in response, are then proactive in initiating contact with the particular effected multi-mobile streaming information network cache memories identifying which segments of streaming information as abandoned and to be discarded or purged.

In one example, a mobile wireless device is traveling within one particular base station service area when multiple mobile wireless device time-location entries associated with the movement of the mobile wireless device are obtained. With these multiple mobile wireless device time-location entries, the system determines or acquires an associated velocity and direction of the mobile wireless device. Knowing this information, and the geographic locations of the system's base stations and their associated service area boundaries, and the multi-mobile streaming information network cache memories associated with each of such base stations, the system determines which future base stations, or base station service areas, or associated multi-mobile streaming information network cache memories, are likely to be intersected by the path of the mobile wireless device (group of multi-mobile streaming information network cache memories, or base stations, along the likely path of the mobile), as well as when the mobile wireless device will enter or arrive at such base station service areas and when the mobile wireless device will exit or depart, and the duration of time of the mobile wireless device at that base station service area. Further, knowing when and where (e.g., which base station) the mobile wireless device will be accessible, the system distributes the sending of the appropriate segments of streaming information to the multi-mobile streaming information network cache memories associated with those base stations whose base station service areas will be intersected during the transmission of the streaming information (predicted base stations).

For example, if it is known that the streaming information will take 10 minutes to transmit, and if it is also known that for minutes 0–4, the mobile wireless device is expected to be communicating with a first base station, and for minutes 5–6, it will be communicating with a second base station, and finally, for minutes 7–10, it will be in communication with yet a third base station, then the segment of streaming information that represents what would be transmitted from minutes 0–4, should be sent to the multi-mobile streaming information network cache memory associated with the first base station, and the segment of streaming information that would be transmitted in minutes 5–6, should be sent to the multi-mobile streaming information network cache memory associated with the second base station, and the last 4 minutes of the streaming transmission should be sent to the multi-mobile streaming information network cache memory associated with the third base station. In certain embodiments, including the preferred embodiment, the segment of streaming information includes overlapping streaming information containing previously sent data, to assure no breaks in the information occur. Here, even though the segment of streaming information contains overlapping streaming information with a previously sent segment of streaming information, the segment of streaming information is different because the streaming information data contained in both of the segments of streaming information are not identical. In this example, the mobile wireless device then analyzes and determines which of the received streaming information is a received overlapping portion (e.g., un-needed) and discards, e.g., purges, sets aside, disregards or otherwise ignores, this received overlapping portion or un-needed received overlapping portion.

In another embodiment, the mobile wireless device time-location entries obtained from the traveling mobile wireless device fall, not within the same base station service area, but within different base station service areas. The knowledge of the location of the mobile wireless device is limited to simply knowing that the device is within a particular base station service area, without any more specific location information. In this embodiment, for example, a central location point of the base station service area is assumed for location purposes (any relative effective point can be used), and the base station service area entry time into each associated base station service area is used, for example, as the time portion of the data. With these mobile wireless device time-location entries, the system makes the same calculations as the previous example resulting in velocity vector information and future predicted base station service area information. With this embodiment in particular, where the absence of specifics is known to exist in at least one of the two components for determining velocity vector information, e.g., the location component, more accurate predictions are obtained by adding additional mobile wireless device time-location entries. This additional information is from multiple base stations, to assist in making a more accurate prediction as to the actual direction and velocity of the mobile wireless device.

In another embodiment, also determining the predicted estimated time of arrival and an estimated departure time of a mobile wireless device to and from a particular base station service area, a corresponding segment of streaming information is preemptively sent to the multi-mobile streaming information network cache memory of the predicted base station, in addition, an estimated time of arrival is also sent to the same base station and multi-mobile streaming information network cache memory. In the case where the mobile wireless device does not arrive at the particular base station service area within a set time after the indicated estimated time of arrival (e.g., non-arrival), the corresponding segment of streaming information is discarded or purged from the associated multi-mobile streaming information network cache memory. In other embodiments, the estimated time of arrival is not sent, but rather the sending of the segment of streaming information is delayed until an appropriate time before the estimated time of arrival where, after arrival, the segment of streaming information simply expires after a set period of time has elapsed without the arrival (non-arrival) of the mobile wireless device, and after such time the segment of streaming information is discarded or purged from the associated multi-mobile streaming information network cache memory or memories.

Figure 3:
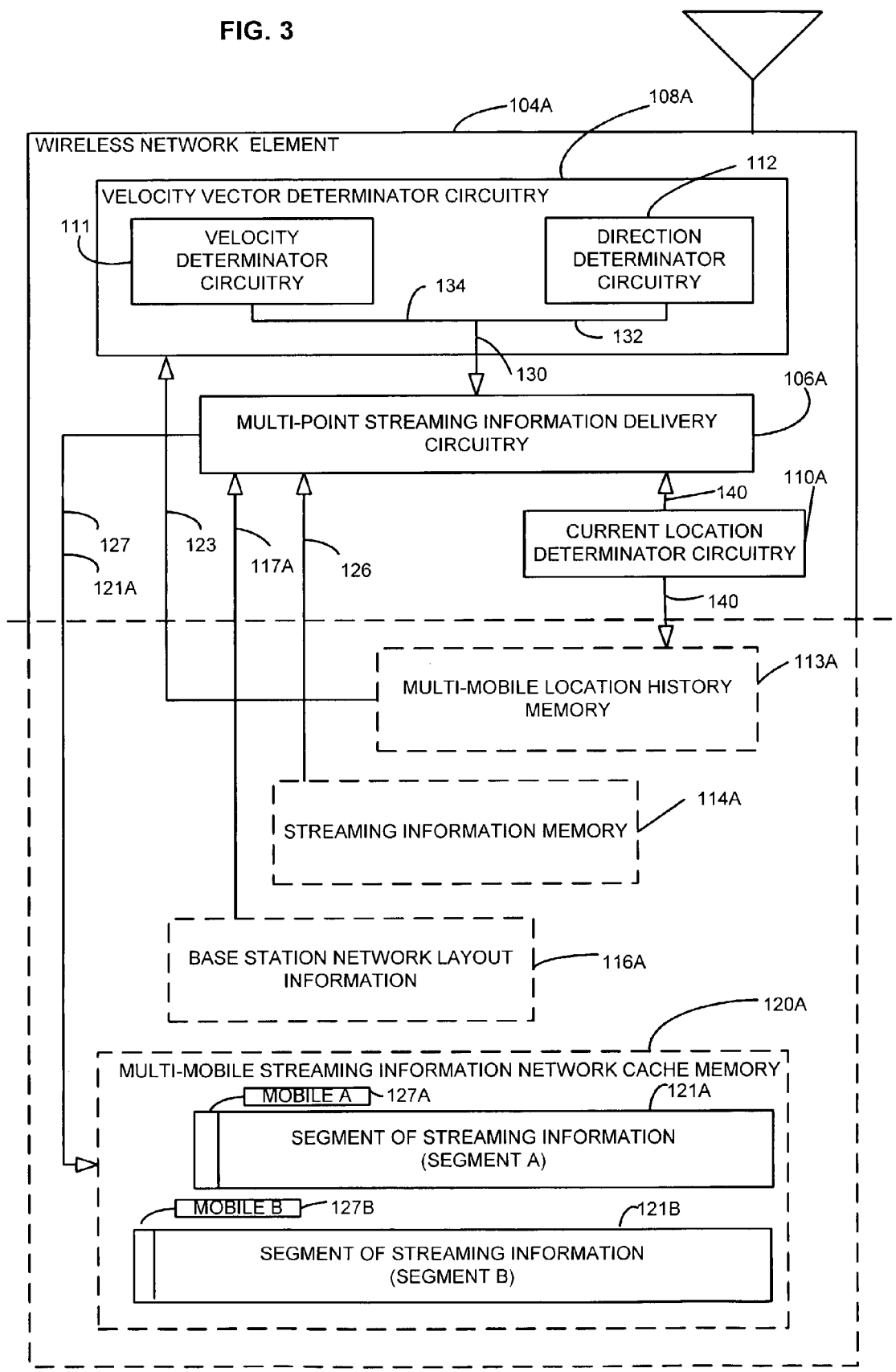
FIG. 3 is a block diagram illustrating one example of a wireless network element in accordance with one embodiment of the invention.
Figure 4:
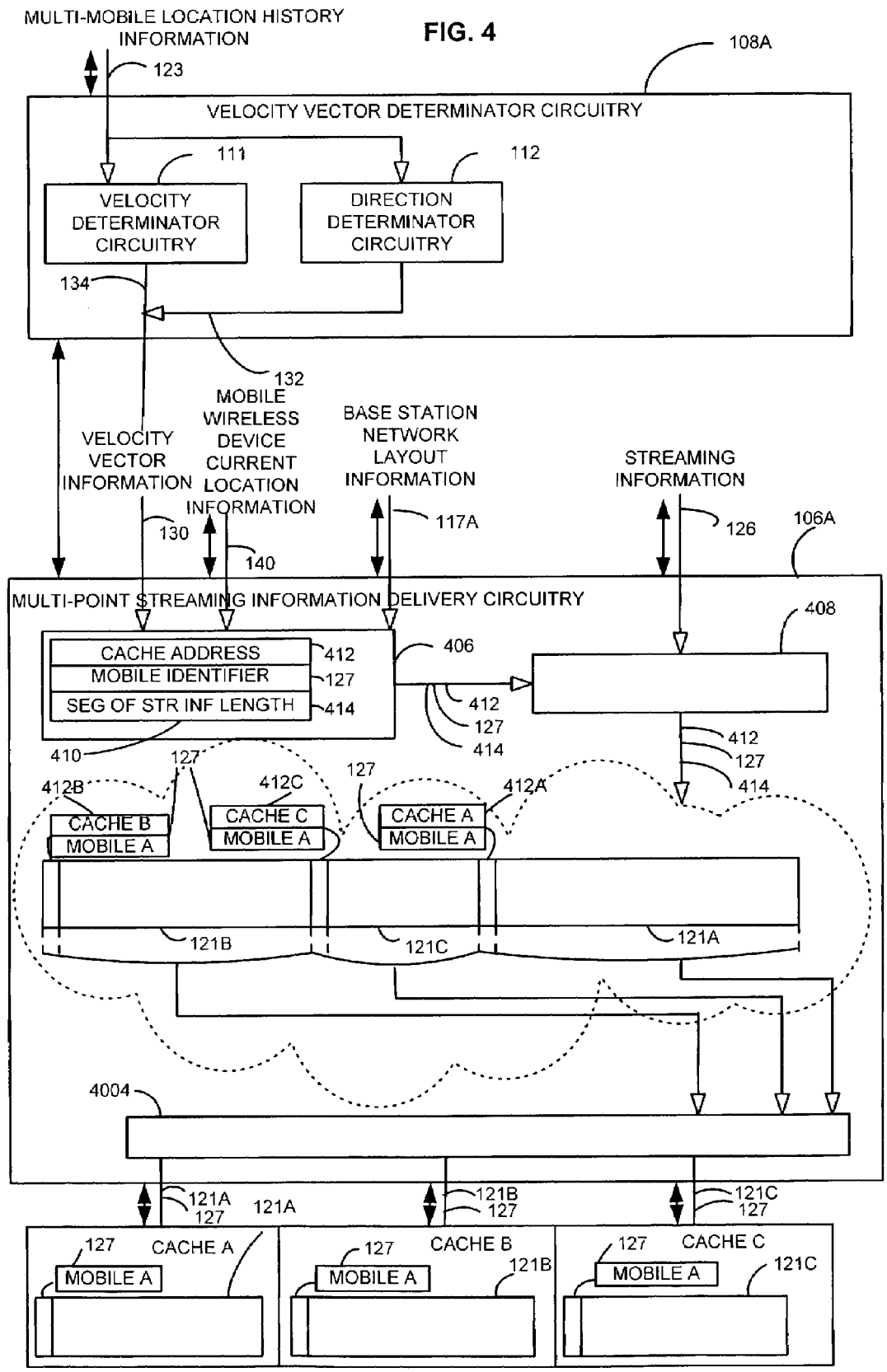
FIG. 4 is a block diagram illustrating one example of particular elements and data flow within a wireless network element in accordance with one embodiment of the invention.

FIG. 1 illustrates a wireless information communication system 100 such as a WWAN or a WLAN, that communicates with a mobile wireless device 102, such as a cell phone, personal data assistant (PDA), laptop computer, and includes wireless network elements 104A and 104B. In this embodiment, each wireless network element 104A–B, contains both a corresponding, and operatively coupled, multi-point streaming information delivery circuitry 106A and 106B (further detail is shown in FIG. 4) and a corresponding velocity vector determinator circuitry 108A and 108B (further detail is shown in FIGS. 3 and 4). Further, each wireless network element 104A–B, also contains current location determinator circuitry 110A–B. Here, the circuitry is preferably executable software being executed by microprocessors or digital signal processors (DSPs). Further, wireless network elements 104A and 104B are also connected to multi-mobile location history memory 113A and 113B, streaming information memory 114A and 114B and base station network layout information database 116A and 116B. Also connected to wireless network elements 104A and 104B are base stations 118A, 118B, 118C and 118D. Further, each of the base stations 118A–D contain associated multi-mobile streaming information network cache memories 120A, 120B, 120C and 120D (note that the memory is not cache memory in all embodiments). The networks discussed herein utilize processors, memory and network connections to perform the functions described. Other embodiments include either more or fewer wireless network elements 104A–B while others include one or more multi-point streaming information delivery circuits 106A–B, or one or more velocity vector determinator circuitry 108A–B, or in one or more wireless network elements 104A–B, or one or more streaming information memory 114A–B, or one or more base station network layout information database 116A–B, or locate any of such items elsewhere within wireless information communication system 100. Further, other embodiments include wireless multi-mobile location history memory 113A–B, or streaming information memory 114A–B, or base station network layout information database 116A–B, located within the wireless network elements 104A–B. Yet other embodiments include in wireless network elements 104A–B all of the above identified elements that are either previously described to be within such wireless network elements or previously described as being connected thereto. Further, the term network infrastructure includes all any one or more elements described as being either within such wireless network elements or connected thereto, but generally contains at least a base station-transceiver type element. Further, network elements or network infrastructure also include all other components known in the art to be part of such wireless communication networks. For example, a wireless network element 104A includes each of the following: multi-point streaming information delivery circuitry 106A, vector velocity vector determinator circuitry 108A, multi-mobile location history memory 113A, streaming information memory 114A, base station network layout information database 116A, base station 118A and multi-mobile streaming information network cache memory 120A. Other embodiments include more or include fewer base stations 118A–D, and such base stations are connected to networks other than the WWAN within the same system 100 (see FIG. 2). Further, other embodiments utilize other known suitable division of operation. In the illustrated embodiment, base station 118A is shown remotely connected to mobile wireless device 102 while transmitting a segment of streaming information 121A. Wireless information communication system 100 is connected to the Internet 122, or other WAN or LAN, through its wireless network elements 104A and 104B. Other embodiments provide an Internet connection elsewhere within system 100 while other embodiments provide Internet connections through more or through fewer wireless network elements. As shown, Internet 122 contains a web server that provides a web page 124 with an embedded link to a streaming information 126 file. Further, in the preferred embodiment each of the base stations 118A–D utilize multi-mobile streaming information network cache 120A–D for storing the segments of streaming information such as segment of streaming information 121A. Along with the segments of streaming information 121A–C is also stored a mobile identifier 128A–B to identify which of a multitude of mobile wireless devices 102 that an intended segment of streaming information 121A–C is intended to be sent. This mobile identifier 128 is also stored in the velocity vector determinator circuitry and is associated with mobile wireless device direction information 132 and mobile wireless device velocity information 134 as well as in the multi-mobile location history memory along with mobile wireless device time information 136 and mobile wireless device coordinate information 138. The mobile wireless device current location information 140 is generated by the current location determinator circuitry 110A–B.

A first user (not shown) uses mobile wireless device 102 to initiate a request for a web page 124 containing a link to streaming information 126 file. Aware that mobile wireless device 102 is currently connected to base station 118A, wireless network element 104A makes a request to the Internet 122 for web page 124. Wireless network element 104A initiates a request for web page 124 storing the web page information in multi-mobile streaming information memory 114A or other suitable memory. Multi-mobile location history memory 113A may be RAM, ROM, distributed memory in one or more circuits or locations, optical or magnetic memory, or any suitable memory that is capable of storing digital information. Detecting that streaming information 126 is associated with web page 124, wireless network element 104A loads streaming information 126 into the multi-mobile location history memory 113A in anticipation of a request for this information from the user. The user then, through a browser or other suitable mechanism, executes the link to streaming information 126. Mobile wireless device 102 then makes a request for streaming information 126 to base station 118A. Base station 118A, aware that a copy of this streaming information 126 is stored on the network, requests the delivery of this information. Base station 118A begins sending the streaming information 126 to mobile wireless device 102. It should be noted that the streaming information requested is expected to be delivered in a continuous fashion during a single and continuing call such that the streaming information can be absorbed, viewed and or listened to from beginning to end, preferably without interruption.

The wireless network element 104A acquires or determines location data regarding mobile wireless device 102 through a variety of ways, including but not limited to one or more of the following: triangulation, signal strength measurements, signal propagation delay, a Global Positioning System (GPS) or other suitable location acquisition or determination schemes, or combination thereof. Initially, at time to, mobile wireless device 102 is a particular mobile wireless device time-location entry (not shown) within base station 118's communication area. The location of mobile wireless device 102 is stored in multi-mobile location history memory 113A. At a later time $t_1$, where, in this instance, mobile wireless device 102 is still connected to base station 118A (although such new location could have been in another base station service area with a different multi-mobile streaming information network cache memory 120A–D) the new associated mobile wireless device location information as shown as a mobile wireless device time-location entry (made up of mobile wireless device identifier 127, mobile wireless device time information 136, and mobile wireless device coordinate information 138) is also stored in the multi-mobile location history memory 113A. Now, in the preferred embodiment, with a minimum of two mobile wireless device time-location entries 123 stored in the multi-mobile location history memory 113A, the velocity vector determinator circuitry 108A obtains (e.g. acquires, determines, produces, retrieves or receives) the velocity vector information 130 based on the change in location data associated with multiple mobile wireless device time-location entries 123. As such, the direction (mobile wireless device direction information 132) and speed (mobile wireless device velocity information 134) of the mobile wireless device is determined. Specifically, in this instance, the velocity vector determinator circuitry 108A determines velocity vector information 130 applicable to mobile wireless device 102 having a mobile wireless device identifier 127 at time $t_1$. Other embodiments do not determine the velocity vector information 130 from within a wireless network element 104A–B, or the network in its entirety, but rather, retrieve or receive this information from another location or entity. The mobile wireless device direction information 132 of velocity vector information 130 can be recorded in any suitable directional recording form, e.g., in the form of North, East, South and West, via a coordinate system, based upon latitude or longitude or any suitable representation. Using, or responsive to, the velocity vector information 130, and knowing the location of mobile wireless device at time $t_1$ (mobile wireless device current location information 140) as determined by the current location determinator circuitry 110A, the multi-point streaming information delivery circuitry 106A obtains the next base station information for mobile wireless device 102, which, in the illustrated case, is base station 118B. Further, knowing the base station network layout information 117A from base station network layout information database 116A, mobile wireless device current location information 140 and the velocity vector information 130, the multi-point streaming information delivery circuitry 106A is able to determine a predicted location information corresponding, in this case, to a location within base station 118B's service area. With this information, and along with the amount of data in streaming information 126 file, the multi-point streaming information delivery circuitry 106A determines how much information of the streaming information 126 will be transferred to mobile wireless device 102 by the time mobile wireless device 102 is transferred to the next base station 118B. The multi-point streaming information delivery circuitry 106A, by knowing the last segment of information that would be sent from base station 118A, begins transmission of the streaming information 126 beginning at the next sequential segment of information after that transferred at the previous base station 118A and ending at the end of the information from the streaming information 126 file that will be transferred to base station 118B before being transferred to yet a next base station (if needed).

It should be noted that the time of any transfer to a next base station may be less than exact for a variety of reasons, e.g. a change in velocity of the mobile wireless device, transferring process delays, network traffic, or other factors, and therefore, it may be advantageous to send overlapping segments or portions of segments of streaming information (sent overlapping portion) to the next predicted base station. To handle the receiving of this sending overlapping portion, the mobile wireless device 102 is adapted with segment of streaming information segment analyzer circuitry 502 (See FIG. 5), to analyze, identify and discard that part of the sending overlapping portion previously received by the mobile wireless device 102 (received overlapping portion 508) while retaining that part of the sending overlapping portion that has not yet been received (un-received overlapping portion 510). It should be noted that what is considered overlapping depends which perspective of the sending-receiving function is being considered. When sending, the sending overlapping portion is that portion of the segment of streaming information that the sending side has previously sent the receiving side. However, when receiving, the received overlapping portion 508 is that portion that the receiving side has previously successfully received. Thus, it is expected that the sending overlapping portion will not always equal the received overlapping portion 508. For example, where any particular segment of streaming information is made up of multiple packets, and where any particular packet can be identified, and where a mobile wireless device receives a new packet that is identified as being prior to the last packet received, then such packet are discarded as repetitive information (e.g., the last packet received was information received from the last connected base station and the new packet is an un-received overlapping portion or packet sent by a new base station.) As used in this document, the term circuitry includes at least the following: one or more processing devices executing software, such as microprocessors, digital signal processors (DSPs), microcontrollers or discrete logic, state machines, or any suitable combination of hardware, software and/or firmware.

Using the same type of functionality described above, e.g., the ability to predict the location of a mobile wireless device at any given time based upon velocity vector information, allows for the prediction of exactly what portion or segment of streaming information will be likely delivered across any particular base station service area. Further, because of the ability to obtain continuous location data of the mobile wireless device 102, the predicted future location of the mobile wireless device 102 can be continuously updated to reflect this new information and the associated velocity vector information can be updated accordingly. And further, the multi-point streaming information delivery circuitry 106A–B contains functionality and associated circuitry such that it utilizes the information from multiple sets of velocity vector information 130 to determine a respective change in velocity vector information (e.g. acceleration) and thus can use this information as a form of velocity vector information in such a manner as to predict the future location of the mobile wireless device 102 at some future time. This ability to predict what portion or segment of streaming information will be likely delivered across any particular base station service area is likewise applicable to the WLAN in an embodiment described later in FIG. 2. Further, where subsequent predictions indicate that a future location has changed, due to a change in mobile wireless device velocity, direction or estimated time of arrival, and where the segments of streaming information were sent to such predicted base stations based upon this prediction, and where initial predictions are contradicted by later predictions, such initial predicted base stations identified later as falling outside the later predicted base stations are contacted, e.g., with an abandoned status code, and instructed to purge, discard or otherwise ignore the associated abandoned segments of streaming information.

Figure 2:
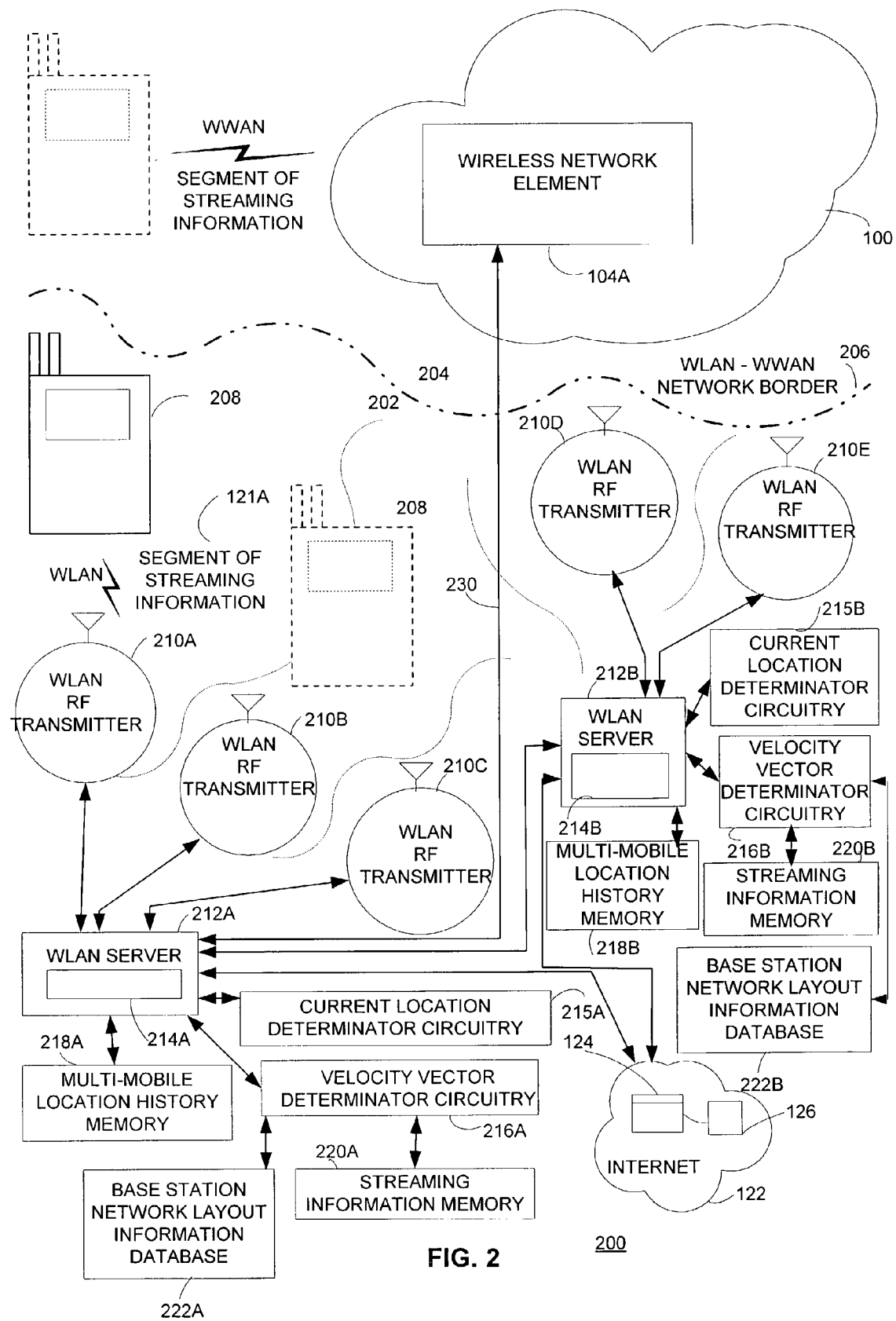
FIG. 2 is a block diagram illustrating one example of a device in accordance with one embodiment of the invention that provides streaming information on a wireless information communication system, having a WLAN portion and WWAN portion, between a network base station and a mobile wireless device in accordance with one embodiment of the invention.

FIG. 2. illustrates one example of a wireless information communication system 200 that provides streaming information having a WLAN portion 202 and WWAN portion 204. For this system, the wireless information communication system 200 is made up of two interconnected networks, a WLAN 202 and a WWAN 204, separated by network border 206. The WWAN 204 performs in much the same way as the wireless information communication system 100 in FIG. 1. However, differences do exist, for example, where mobile wireless device 208 contains dual network circuitry (shown with two antennas) to communicate to both a WWAN 204 and a WLAN 202. Further, although not shown in FIG. 2, multi-mobile streaming information network cache is also associated with each base station 210A, 210B, 210C, 210D and 210E in the preferred embodiment. In this embodiment, as in the preferred embodiment, predicted segments of streaming information for multiple wireless mobile devices are stored in the multi-mobile streaming information network cache of the associated base station. Thus, multiple base stations store multiple segments of streaming information for multiple mobile wireless devices. Further, the mobile wireless device 208 uses the appropriate network protocol based upon the type of network being used.

The WLAN 202 may be a high bandwidth/short distance type network such as a Bluetooth system, or other suitable system. Mobile wireless device 208 is shown located in the base station service area of WLAN RF transmitter (base station) 210A. Mobile wireless device 208 is also shown in dashed lines entering the base station area associated with base station 210B. This embodiment of WLAN 202 contains two WLAN servers 212A and 212B, each with their respective multi-point streaming information delivery circuitry 214A and 214B. In addition, current location determinator circuitry 215A and 215B, velocity vector determinator circuitry 216A and 216B, multi-mobile location history memory 218A and 218B, streaming information memory 220A and 220B and base station network layout information database 222A and 222B. Although two servers are shown here, other embodiments utilize any suitable number of servers and such servers use one or more multi-point streaming information delivery circuitry 214A–B, and, in some embodiments, are located elsewhere within WLAN 202 or connected thereto. WLAN 202 is connected to the Internet 122 through its WLAN servers 212A–B or other link. As shown, Internet 122 contains a web server that provides web page 124 with an embedded link to streaming information 126 file. Each WLAN server 212A–B is connected to current location determinator circuitry 215A–B and velocity vector determinator circuitry 216A–B. Although shown located outside WLAN server 212A–B here, the separate current location determinator circuitry 215-B and separate velocity vector determinator circuitry 216A–B, in other embodiments, are located in the same WLAN server 212A–B. In other embodiments, either or both, the single current location determinator circuitry 215A–B and the single velocity vector determinator circuitry for multiple WLAN servers 212A–B are located at only a single location and must be accessed remotely from the corresponding WLAN servers 212A–B. Furthermore, WLAN servers 212A–B are also connected to base stations 210A–E. Other embodiments include more or less base stations, and have inter networks connections limited to WLANs. Finally, base station (RF transmitter) 210A is shown remotely connected to mobile wireless device 208 while transmitting a segment of streaming information 121A.

In operation, the WLAN 202 functions in much the same manner as that described for the WWAN 204 in FIG. 1. However, differences do exist. For example, and as discussed above, WLAN handoffs are based on signal strength and signal to noise rations. The access points, e.g., base stations 210A–E, just drops the wireless mobile device 208 when the signal reaches a low threshold and then the wireless mobile device has to then identify the access point, e.g., base station 210A–E that is best suited for accessing it.

FIG. 3 illustrates a block diagram of one example of a wireless network element 104A in accordance with one embodiment of the invention. Here, wireless network element 104A is shown to contain velocity vector determinator circuitry 108A, multi-point streaming information delivery circuitry 106A and current location determinator circuitry 110A. Further, velocity vector determinator circuitry 108A is also shown to have velocity determinator circuitry 111 and direction determinator circuitry 112. In addition, and in dashed lines, is shown that in some embodiments multi-mobile location history memory 113A is included in wireless network element 104A. Also shown in dashed form, is streaming information memory 114A, base station network layout information database 116A, and multi-mode streaming information network cache memory 120A located in wireless network element 104A if desired. Further, and as indicated with the antenna shown attached to wireless network element 104A, some embodiments of the wireless network element 104A include all of the components associated with a base station 118A, such that a wireless network element 104A includes all the elements of base station 118A (the wireless network element and the base station are one and the same). Also visible in FIG. 3 are the following: base station network layout information 117A, mobile wireless device time-location entries 123, streaming information 126, segment of streaming information 121A, mobile wireless device identifier 127 and mobile wireless device current location information 140.

FIG. 4 illustrates a more detailed example of both the velocity vector determinator circuitry 108A and the predictive multi-point streamlining information delivery circuit 106A. As shown, this embodiment includes velocity determinator circuitry 111 and direction determinator circuitry 112. The multi-point streaming information delivery circuit 106A includes multi-base station service area cache content determinator circuitry 406, streaming information parser circuitry 408 and a segments of streaming information router 410.

In the preferred embodiment, the velocity vector determinator circuitry 108A receives mobile wireless device time-location entries 123 as input. The velocity determinator circuitry 111 transforms the mobile wireless device time-location entries 123 into mobile wireless device velocity information 134. In addition, the direction determinator circuitry 112 transforms the mobile wireless device time-location entries 123 into mobile wireless device direction information 132. Together the velocity and direction information make up velocity vector information 130. Other embodiments may use either (e.g., not both) mobile wireless device direction information 132 or mobile wireless device velocity information 134 in conjunction with the multi-point streaming information delivery circuitry 106A.

In this embodiment, the multi-point streaming information delivery circuitry 106A receives as input the following: velocity vector information 130, mobile wireless device current location information 140, streaming information 126, and base station network layout information 117A. The multi-base station service area cache content determinator 406 transforms the velocity vector information 130, mobile wireless device current location information 140 and the base station network layout information 117A into information containing both the group of base stations along the likely path of the mobile and the estimated duration time that would be spent at each corresponding base station. Note again that the information received by the multi-base station service area cache content determinator 406 may be limited to only one of the two velocity vector information 130 components, and as such, the plurality of base stations and the estimated duration time will be effected (e.g., if speed is not known, then duration will not be known, if direction is not known, then a wider plurality of potential base stations will increase). The base station network layout information 117A can be any mapping information that identifies the layout of the system such that velocity vector information 130 can be used to determine how the predicted path of the wireless mobile device intersects existing base station service areas. The streaming information parser circuitry 408 receives the following streaming information segment parameters from the multi-base station service area cache content determinator circuitry 406: a multi-mobile stream of information network cache memory address 412 (412A–412C), a mobile wireless device identifier 127 and a segment of streaming information length 414. It should be noted that the multi-mobile stream of information network cache memory address 412 could be any form of identifier (multi-mobile stream of information network cache memory identifier) and need not be an actual address, (e.g., need not be a memory address). The streaming information parser circuitry 408 also receives as input the streaming information 126. The streaming information parser circuitry 408 utilizes the above information to generate the following outputs for delivery via the segments of streaming information router 410 to the associated multi-mobile streaming information network cache memories 120A–C: a multi-mobile streaming information network cache memory address 412, a mobile wireless device identifier 127 and segments of streaming information 121A–C. Here, the segments of streaming information 121A–C are tailored to the duration that the mobile wireless device is expected to spend at the corresponding base stations, and is limited to only that group of base stations actually expected to receive the streaming information 126.

Figure 5:
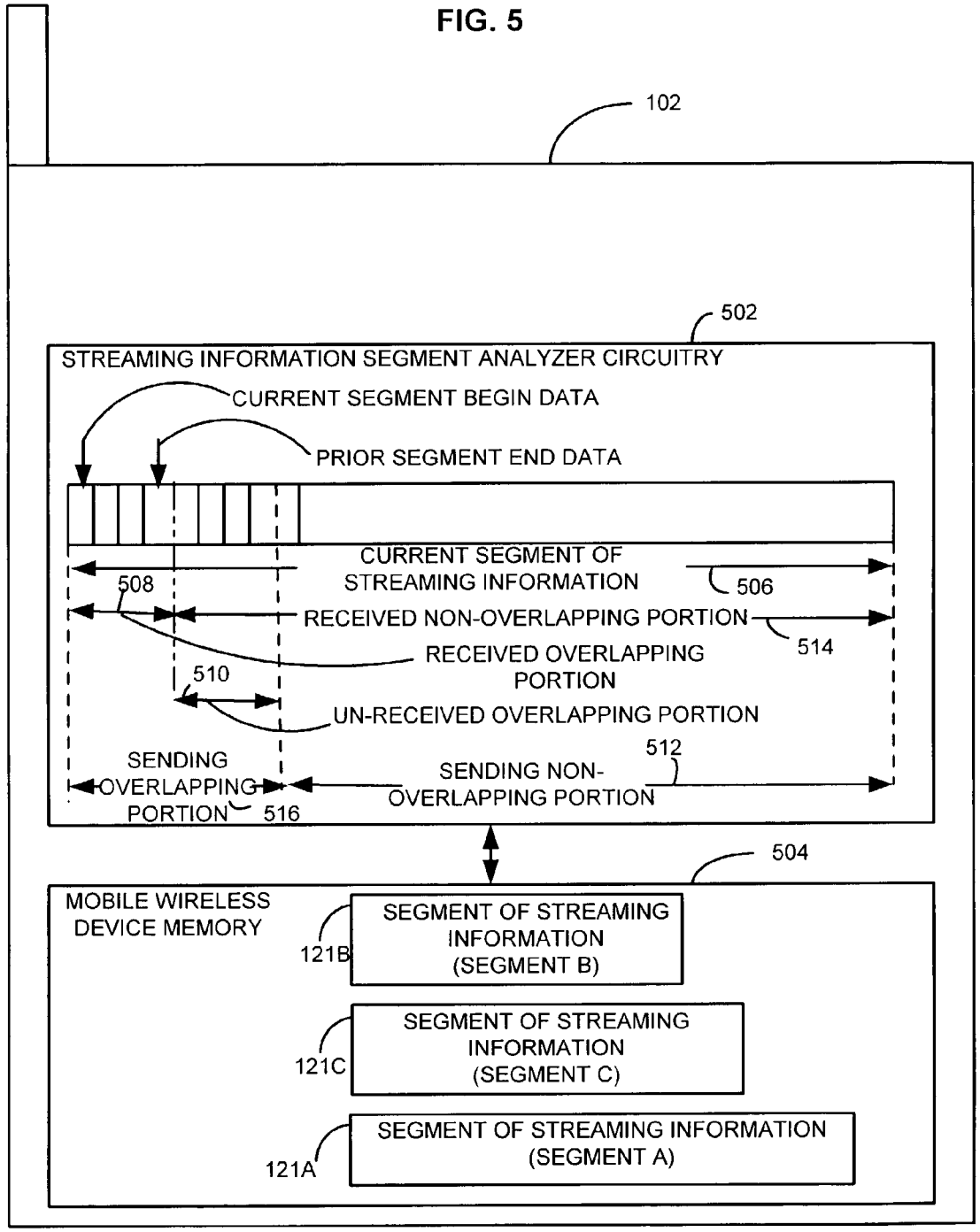
FIG. 5 is a block diagram illustrating one example of a mobile wireless device in accordance with one embodiment of the invention.

FIG. 5 illustrates a more detailed example of a mobile wireless device 102. As shown, this embodiment contains streaming information segment analyzer circuitry 502 operatively coupled with mobile wireless device memory 504. The streaming information segment analyzer circuitry 502 further includes a current segment of streaming information 506. Here, the circuitry is preferably software executing via a microprocessors or a digital signal processors (DSPs). The current segment of streaming information 506 is made up of the following portions: a received overlapping portion 508, an un-received overlapping portion 510, a sending non-overlapping portion 512, a received non-overlapping portion 514 and a sending overlapping portion 516. The mobile wireless device memory 504 receives segments of streaming information 121A–C from external base stations. These segments of streaming information 121A–C are processed by the streaming information segment analyzer circuitry 502. In this embodiment, this process operates as follows: the current segment of streaming information 506 is analyzed to determine if it contains any streaming information previously received (received overlapping portion 508) by the mobile wireless device 102. If so, this received overlapping portion is discarded, purged or otherwise ignored, and only the remaining received non-overlapping portion 514 are processed by the mobile wireless device 102 as streaming information 126.

Figure 6:
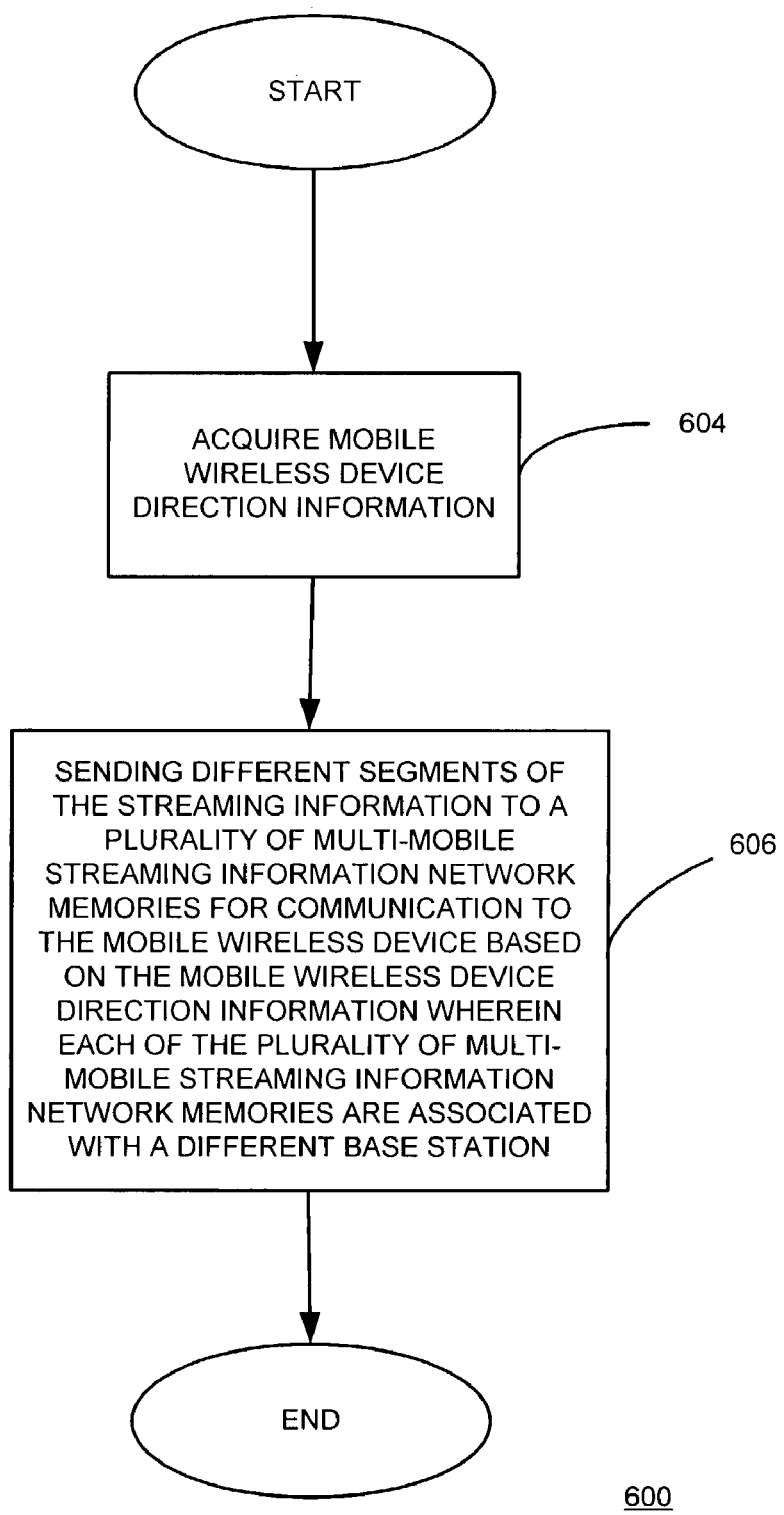
FIG. 6 is a flow chart illustrating one example of a method for providing information to a mobile wireless device via multiple network base stations in a predictive manner in accordance with one embodiment of the invention.

FIG. 6 illustrates one example 600 of a method for providing streaming information 126 to a mobile wireless device 102 via multiple base stations 118A–D in a predictive manner. Specifically, FIG. 6 describes a step 604 where mobile wireless device direction information 132 is acquired or determined. FIG. 6 also demonstrates a step 606 of where different segments of the streaming information 121A–C are sent to a plurality of multi-mobile streaming information network memories 120A–D for communication to the mobile wireless device 102 based on the mobile wireless device direction information 132 wherein each of the plurality of multi-mobile streaming information network memories 120A–D are associated with a different base station 118A–D.

Figure 7:
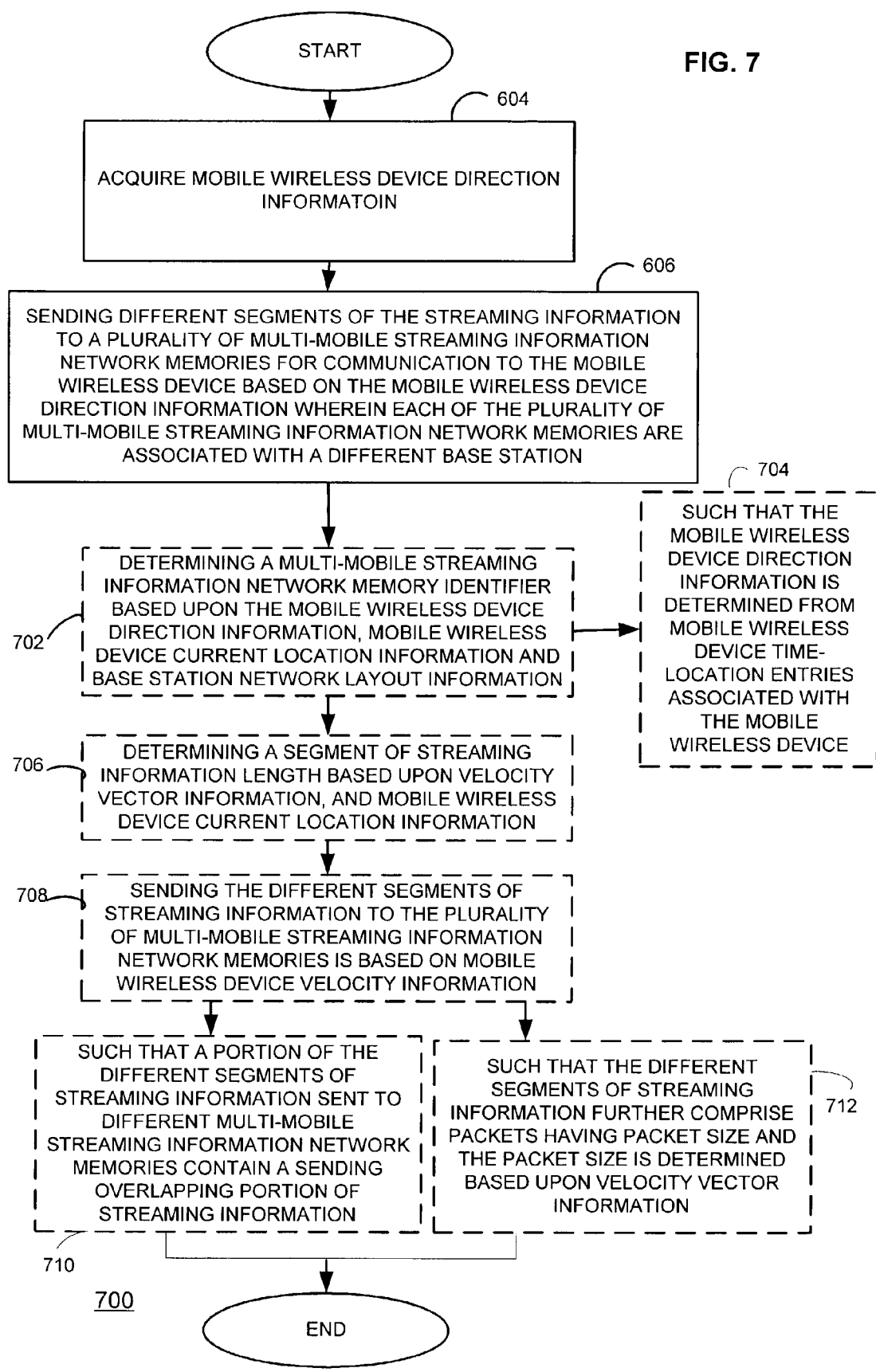
FIG. 7 is a flow chart illustrating in detail, one example of a method for providing information to a mobile wireless device via multiple network base stations in a predictive manner in accordance with one embodiment of the invention.

FIG. 7 illustrates a more detailed example 700 of a method 600 for providing streaming information 126 to a mobile wireless 102 device via multiple base stations 118A–D in a predictive manner. Specifically, in addition to showing the steps 604 and 606 of method 600, additional optional steps are also shown. The first optional step 702 is used to determine a multi-mobile streaming information network memory identifier 412 based upon the mobile wireless device direction information 132, mobile wireless device current location information 140 and base station network layout information 117A. Step 702 is further limited by optional step 704 such that the mobile wireless device direction information 132 is acquired or determined from mobile wireless device time-location entries 123 associated with the mobile wireless device 102. Next optional step 706 is used to determining a segment of streaming information length 414 based upon velocity vector information 130, and mobile wireless device current location information 140. Further, Step 708 may be achieved, for example, using User Datagram Protocol (UDP) to adjust packet size. Optional step 708 is used to send the different segments of streaming information 121A–C to the plurality of multi-mobile streaming information network memories 120A–D is based on mobile wireless device velocity information 134. Further, step 710 further limits optional step 708 such that a portion of the different segments of streaming information 121A–C sent to different multi-mobile streaming information network memories 120A–D contain a sending overlapping portion of streaming information 516. Step 712 also limits optional step 708 such that the different segments of streaming information 121A–C further comprise packets having packet size and the packet size is determined based upon velocity vector information 130.

Figure 8:
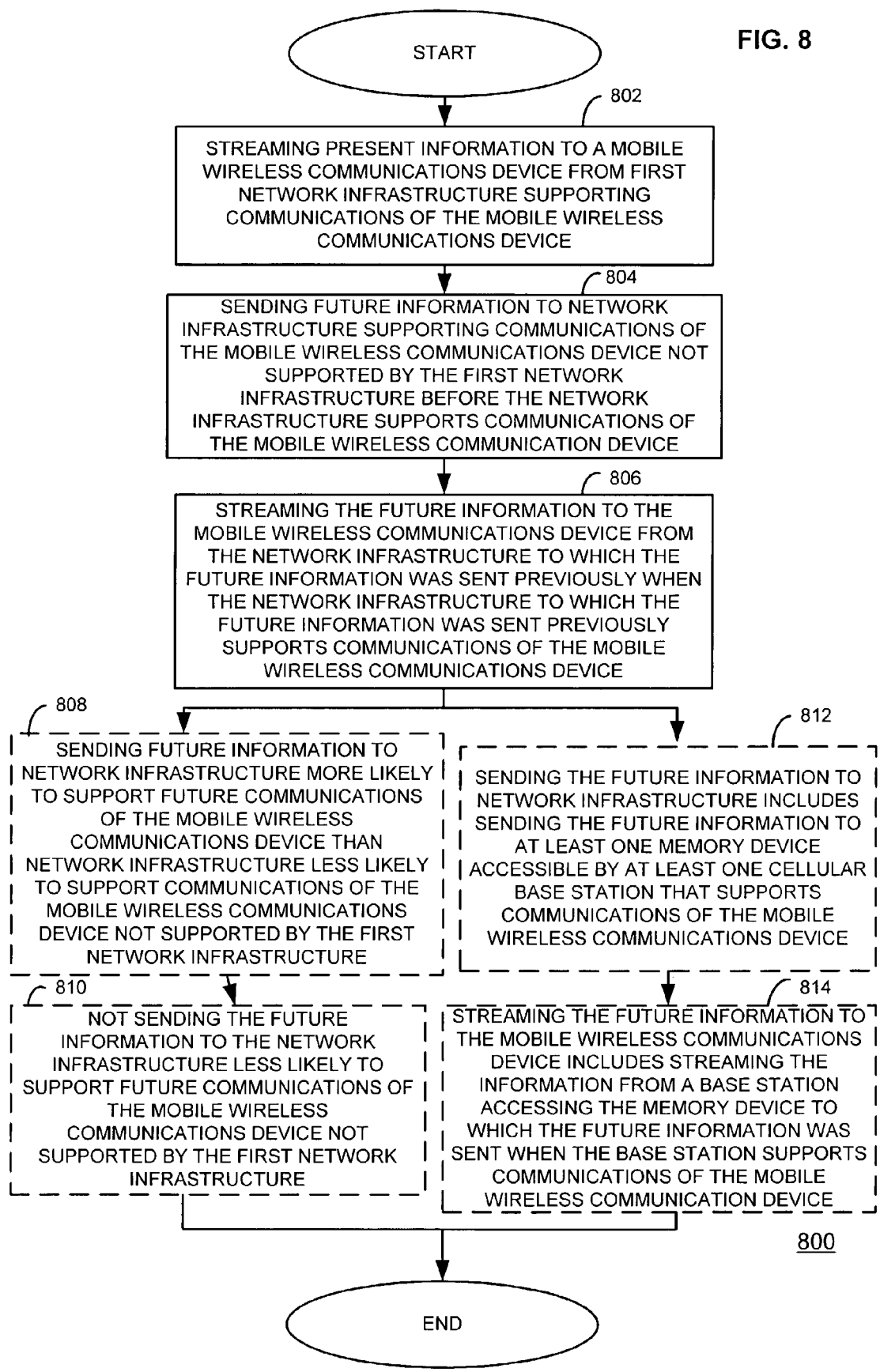
FIG. 8 is a flow chart illustrating one example of a method for providing information to a mobile wireless communications device via multiple network infrastructure capable of supporting communications with the wireless device in a predictive manner in accordance with one embodiment of the invention.

FIG. 8 illustrates a method 800 for providing streaming information 126 to a mobile wireless communications device 102 via multiple network infrastructure 118A–D capable of supporting communications with the mobile wireless communications device 102 in a predictive manner in accordance with one embodiment of the invention. Initially, step 802 includes streaming present information 121A to a mobile wireless communications device from first network infrastructure 118A supporting communications of the mobile wireless communications device 102. Next, step 804 sends future information 121B to network infrastructure supporting 118B communications of the mobile wireless communications device not supported by the first network infrastructure. Step 806, in turn, streams the future information 121B to the mobile wireless communications device 102 from the network infrastructure 118B to which the future information 121B has been sent when the network infrastructure 118B to which the future information has been sent supports communications of the mobile wireless communications device 102. Optional step 808 limits step 806 by requiring sending future information 121B to network infrastructure 118B more likely to support future communications of the mobile wireless communications device than network infrastructure less likely to support communications of the mobile wireless communications device 102 not supported by the first network infrastructure 118A. Next optional step 810 further limits both steps 808 and 806 by not sending the future information 121B to the network infrastructure less likely to support future communications of the mobile wireless communications device 102 not supported by the first network infrastructure 118A. Optional step 812 also limits step 806 where the sending the future information 121B to network infrastructure 118A includes sending the future information 121B to at least one memory device 120A accessible by at least one cellular base station 118A that supports communications of the mobile wireless communications device 102. Finally, optional step 814 further limits both step 812 and 806 where streaming the future information 126 to the mobile wireless communications device 102 includes streaming the information 121B from a base station 118B accessing the memory device 120B to which the future information 121B was sent when the base station 118B supports communications of the mobile wireless communication device 102.

Figure 9:
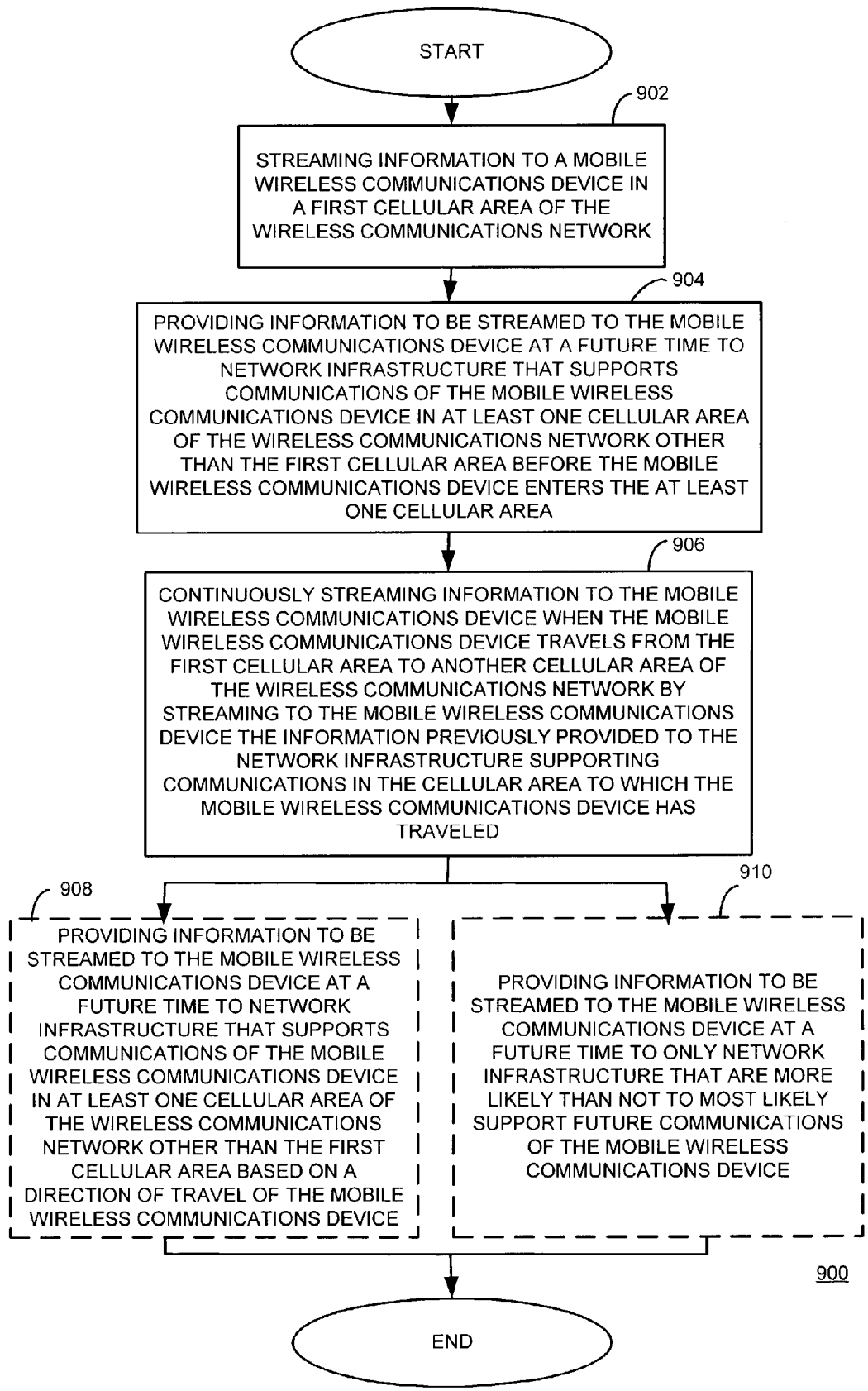
FIG. 9 is a method for providing information to a mobile wireless communications device via multiple network infrastructure capable of supporting communications with the wireless device in a predictive manner in accordance with one embodiment of the invention.

FIG. 9 illustrates a method 900 for providing streaming information 121A–D to a mobile wireless communications device 104 via multiple network infrastructure 118A–D capable of supporting communications with the mobile wireless communications device 102 in a predictive manner in accordance with one embodiment of the invention. Step 902 includes streaming information 121A to a mobile wireless communications device 102 in a first cellular area of the wireless communications network 204. Step 904 further includes providing information to be streamed to the mobile wireless communications device 102 at a future time to network infrastructure 118B that supports communications of the mobile wireless communications device 102 in at least one cellular area of the wireless communications network 204 other than the first cellular area before the mobile wireless communications device 102 enters the at least one cellular area. Next, step 906 further includes continuously streaming information 121A–D to the mobile wireless communications device 102 when the mobile wireless communications device 102 travels from the first cellular area to another cellular area of the wireless communications network 204 by streaming to the mobile wireless communications device 102 the information 121B previously provided to the network infrastructure 118B supporting communications in the cellular area to which the mobile wireless communications device 102 has traveled. Optional step 908 further limits step 906 in providing information to be streamed 121B to the mobile wireless communications device 102 at a future time to network infrastructure 118B that supports communications of the mobile wireless communications device 102 in at least one cellular area of the wireless communications network 204 other than the first cellular area based on a direction of travel 132 of the mobile wireless communications device 102. Optional step 910 also limits step 906 in providing information 121B to be streamed to the mobile wireless communications device 102 at a future time to only network infrastructure that are more likely than not to most likely support future communications of the mobile wireless communications device 102.

Figure 10:
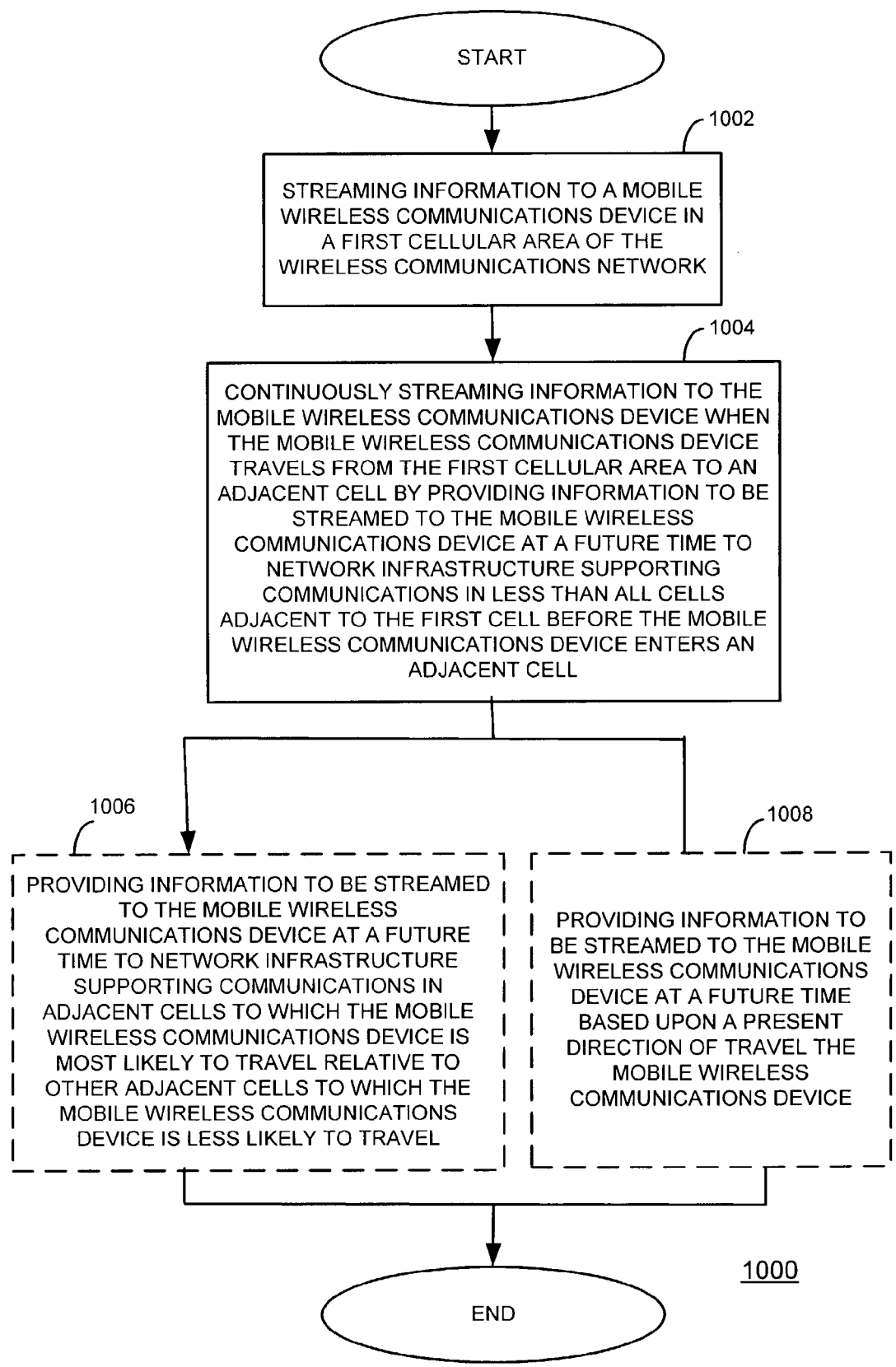
FIG. 10 is a method for providing information to a mobile wireless communications device via network infrastructure capable of supporting communications with the wireless device in a predictive manner in accordance with one embodiment of the invention.

FIG. 10 illustrates a method 1000 for providing streaming information 126 to a mobile wireless communications device 102 via multiple network infrastructure 118A–D capable of supporting communications with the wireless device 102 in a predictive manner in accordance with one embodiment of the invention. Step 1002 includes streaming information to a mobile wireless communications device 102 in a first cellular area of the wireless communications network 204. Further step 1004 includes continuously streaming information 121A–D to the mobile wireless communications device 102 when the mobile wireless communications device 102 travels from the first cellular area to an adjacent cell by providing information to be streamed to the mobile wireless communications device 102 at a future time to network infrastructure supporting communications in less than all cells adjacent to the first cell before the mobile wireless communications device 102 enters an adjacent cell. Optional step 1006 further limits step 1004 in providing information to be streamed 121B to the mobile wireless communications device 102 at a future time to network infrastructure supporting communications in adjacent cells to which the mobile wireless communications device 102 is most likely to travel relative to other adjacent cells to which the mobile wireless communications device 102 is less likely to travel. Next, optional step 1008 also limits step 1004 in providing information to be streamed 121B to the mobile wireless communications device 102 at a future time is based upon a present direction of travel 132 the mobile wireless communications device 102.

All circuitry discussed herein, and particularly such circuitry that is specifically identified as being preferably in a for of computer code, can be stored as computer code on a variety of computer readable mediums, such as floppy disks, hard disks, compact disks, optical storage media, or any other suitable storage means for digital information. And such computer readable program code stored on such mediums, can be executed, causing one or more processors to perform the functionality inherent in such code, and as described above.

As illustrated, the above methods and apparatus, among other things, provide delivery of predictive segments of streaming information to predictive base stations. This can enhance a user's experience by increasing the smoothness of the delivery of streaming information to a mobile wireless device. Other advantages will be recognized by those of ordinary skill in the art.

The above apparatus and methods, among other advantages, utilize a series of location data to obtain velocity vector information of an in-transit mobile wireless device. Further, such information is used in conjunction with a known layout of a series of base stations to predict the arrival and departure times of the mobile wireless device to each of the intersected base station service areas. With this information, a known file of streaming information can be mapped across the set of intersected base stations such that only a pre-selected segment of the streaming information is sent to each corresponding base station. Other advantages will be recognized by those skilled in the art.

It should be understood that the implementation of other variations and modifications of the invention and its various aspects will be apparent to those of ordinary skill in the art, and that the invention is not limited by the specific embodiments described. It is therefore contemplated to cover by the present invention, and all modifications, variations, or equivalents that fall within the spirit and scope of the basic underlying principles disclosed and claimed herein.

What is claimed is:

1. A method for providing streaming information to a mobile wireless device comprising:
   acquiring at least mobile wireless device direction information; and
   sending different segments of the streaming information to a plurality of multi-mobile streaming information network memories for communication to the mobile wireless device, based on the mobile wireless device direction information;
   wherein each of the plurality of multi-mobile streaming information network memories are associated with a different base station.

2. The method of claim 1 further comprising:
   determining a multi-mobile streaming information network memory identifier based upon the mobile wireless device direction information, mobile wireless device current location information and base station network layout information.

3. The method of claim 1 further comprising:
   determining a segment of streaming information length based upon velocity vector information, and mobile wireless device current location information.

4. The method of claim 1 wherein the sending the different segments of streaming information to the plurality of multi-mobile streaming information network memories is further based on mobile wireless device velocity information.

5. The method of claim 4 such that a portion of the different segments of streaming information sent to different multi-mobile streaming information network memories contain a sending overlapping portion of streaming information.

6. The method of claim 4 such that the different segments of streaming information further comprise packets having packet size and the packet size is determined based upon velocity vector information.

7. The method of claim 2 such that the mobile wireless device direction information is determined from mobile wireless device time-location entries associated with the mobile wireless device.

8. A method for processing streaming information at a mobile wireless device comprising:
   storing segments of streaming information received from a plurality of multi-mobile streaming information network memories containing segments based upon mobile wireless device direction information; and
   discarding received overlapping portions of the segments of streaming information received from the plurality of multi-mobile streaming information network memories.

9. A wireless network element for providing streaming information to a mobile wireless device comprising:
   direction determinator circuitry operative to acquire at least mobile wireless device direction information; and
   multi-point streaming information delivery circuitry to send different segments of the streaming information to a plurality of multi-mobile streaming information network memories for communication to the mobile wireless device based on the mobile wireless device direction information, wherein each of the plurality of multi-mobile streaming information network memories are associated with a different base station.

10. A system for providing streaming information to a mobile wireless device comprising:
- a plurality of multi-mobile streaming information network memories; and
- a wireless network element operatively coupled to the plurality of multi-mobile streaming information network memories comprising:
    - direction determinator circuitry operative to acquire at least mobile wireless device direction information; and
    - multi-point streaming information delivery circuitry to send different segments of the streaming information to a plurality of multi-mobile streaming information network memories for communication to the mobile wireless device based on the mobile wireless device direction information, wherein each of the plurality of multi-mobile streaming information network memories are associated with a different base station.

* * * * *